United States Patent
Partington et al.

(10) Patent No.: US 8,565,405 B2
(45) Date of Patent: Oct. 22, 2013

(54) TELEPHONE CALL HANDLING

(75) Inventors: Garry Partington, Lancashire (GB); Howard John Simms, Altrincham (GB); Adam John Fleming, Cheshire (GB); Benjamin James Last, Western Australia (AU); Graham Nigel Dean, Manchester (GB)

(73) Assignee: Panaram Limited, Manchester (GB)

( * ) Notice: Subject to any disclaimer, the term of this patent is extended or adjusted under 35 U.S.C. 154(b) by 547 days.

(21) Appl. No.: 12/867,489

(22) PCT Filed: Feb. 13, 2009

(86) PCT No.: PCT/GB2009/000398
§ 371 (c)(1), (2), (4) Date: Jan. 20, 2011

(87) PCT Pub. No.: WO2009/101413
PCT Pub. Date: Aug. 20, 2009

(65) Prior Publication Data
US 2011/0103576 A1    May 5, 2011

(30) Foreign Application Priority Data
Feb. 13, 2008 (GB) .................................. 0802602.3

(51) Int. Cl.
*H04M 7/00* (2006.01)

(52) U.S. Cl.
USPC ............ 379/221.01; 379/220.01; 379/221.14; 379/272; 379/273; 379/419

(58) Field of Classification Search
USPC .......... 379/221.01, 220.01, 221.14, 272, 273, 379/419
See application file for complete search history.

(56) References Cited

U.S. PATENT DOCUMENTS

| | | |
|---|---|---|
| 5,337,352 A | 8/1994 | Kobayashi et al. |
| 6,233,457 B1 | 5/2001 | Wiehe |
| 6,366,576 B1 | 4/2002 | Haga |
| 6,594,353 B1 * | 7/2003 | Weinhappl .................... 379/196 |
| 6,628,951 B1 | 9/2003 | Grohn et al. |
| 7,139,370 B1 * | 11/2006 | Tse ............................ 379/88.17 |
| 7,274,686 B2 * | 9/2007 | Narain et al. ................. 370/352 |
| 2004/0198362 A1 | 10/2004 | Ala-Luukko et al. |
| 2004/0210639 A1 * | 10/2004 | Ben-Yoseph et al. ......... 709/206 |

(Continued)

FOREIGN PATENT DOCUMENTS

| | | |
|---|---|---|
| EP | 0724371 A1 | 7/1996 |
| EP | 0858204 A2 | 1/1998 |

(Continued)

*Primary Examiner* — Joseph J Nguyen
(74) *Attorney, Agent, or Firm* — Barlow, Josephs & Holmes, Ltd.

(57) ABSTRACT

A telephone handset is provided with a user interface which includes a display unit, audio output unit and various user actuable keys. A phone controller implements and responds to instructions from the user interface. Where the instructions from the user interface request the connection of a call, the phone controller connects the handset to a PSTN via one of a plurality of connection means provided. Similarly, in the event of an incoming call connection request received via any one of the connection means, the phone controller enables the connection of the call. The user may choose to accept or reject the connection using the interface. The handling of an incoming or outgoing call is determined by a connection routing engine. The connection routing engine comprises an identification unit, a rules unit, a comparison unit and an enabling unit.

16 Claims, 2 Drawing Sheets

(56) References Cited

U.S. PATENT DOCUMENTS

Figure 1:
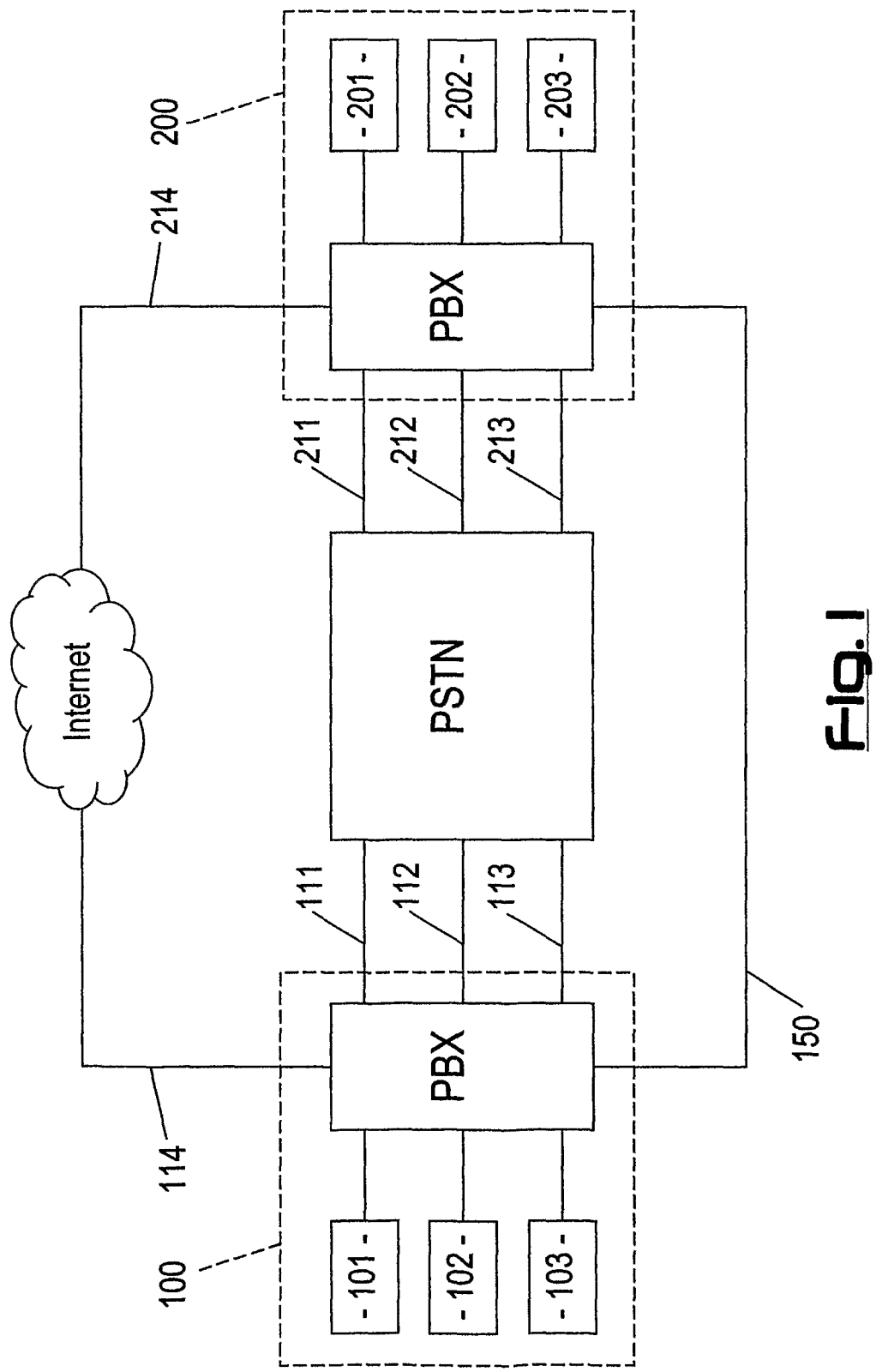

| | | |
|---|---|---|
| 2005/0025134 A1 | 2/2005 | Armistead |
| 2005/0198173 A1* | 9/2005 | Evans .......................... 709/206 |
| 2005/0232402 A1* | 10/2005 | Greve ........................ 379/88.22 |
| 2006/0126562 A1 | 6/2006 | Liu |
| 2006/0251238 A1* | 11/2006 | Richartz et al. .......... 379/265.12 |
| 2007/0064607 A1 | 3/2007 | Moon et al. |
| 2007/0121590 A1 | 5/2007 | Turner et al. |
| 2007/0133775 A1 | 6/2007 | Winkler |
| 2007/0255797 A1 | 11/2007 | Dunn et al. |
| 2008/0009269 A1* | 1/2008 | Ricci .......................... 455/412.1 |
| 2008/0293427 A1 | 11/2008 | Quon et al. |

FOREIGN PATENT DOCUMENTS

| | | |
|---|---|---|
| EP | 1538851 A2 | 11/2004 |
| EP | 1768360 A1 | 3/2007 |
| JP | 2000059437 A | 2/2000 |
| WO | 03009622 A1 | 1/2003 |
| WO | 2004014098 A1 | 2/2004 |
| WO | 2007146625 A1 | 12/2007 |

\* cited by examiner

TELEPHONE CALL HANDLING

The present invention relates to telephone call handling and in particular to a telephone handset operable to implement automatic telephone call handling including, if required, automatic call routing.

In a traditional telephone system, when a user desires to make a voice call they input the appropriate telephone number details to their handset, the handset forwards the number details onto its local private branch exchange (PBX), which determines how the call should be routed either to another extension on the PBX or to the public switched telephone network (PSTN), typically by selecting a particular telephone service provider or by routing the call via another type of network such as a voice over internet protocol (VOIP) network. The particular routing selected by the PBX may be determined according to various criteria including connection cost, connection availability and connection quality amongst others.

Whilst this works well in the case where all voice calls are made from fixed line handsets connected to a local PBX, this does not necessarily control operations adequately wherein an organisation additionally has handsets that may connect calls via one or more methods which bypass the PBX. An example of this might be a mobile or cellular telephone handset incorporating an internet connection. Such a phone may be able to route calls via one or more cellular networks or via VoIP using the internet connection. An additional example might be a smart phone that can route calls direct or via a PBX. When such additional connection options are available it is not always practicable or sensible to insist that all calls made from such handsets are routed via a dedicated PBX.

Such handsets require the user to manually intervene to select a non-default connection option or to select a different connection option to that used for the previous call. Since user intervention is required to vary connection routing options, calls from such handsets may not be made using the optimum connection routing. This can result in increased operating costs for the user and/or reduced connection quality.

Additionally, routing of a call is only one aspect of how a call may be handled. Where a handset is operating in conjunction with a PBX or telephone switch it may be desirable to modify or configure the settings of the PBX or switch in response to the placing of a call, or to advise the PBX or separate system that the call has taken place. Additionally, the handling of a call may require the destination number of the call to be modified, or the call to be blocked from taking place.

Additionally such handsets only address the handling of outgoing calls. On many occasions it may be useful or desirable for incoming calls to be handled according to a particular protocol.

It is therefore an object of the present invention to provide an apparatus and/or method by means of which the above problems can be at least partially overcome or alleviated.

In accordance with a first aspect of the present invention there is provided a telephone handset of the type operable to make an outgoing connection to another handset or device and receive an incoming connection from another handset or device, the telephone handset comprising: at least one connection means for connecting incoming or outgoing voice calls to other handsets or devices via a plurality of different networks or other links wherein the handset is further provided with a call handling engine comprising an identification unit, a rules unit, a comparison unit and an enabling unit, wherein the identification unit is operable to identify the source of an incoming call or the destination of an outgoing call, the rules unit is operable to identify valid options for handling a requested incoming or outgoing call according to predetermined rules, the comparison unit is operable to rank the valid call handling options according to predetermined criteria and the enabling unit is operable to enable the top ranked handling option.

The provision of a call handling engine in the handset allows the handset to autonomously select an optimum handling procedure for an incoming or outgoing call from the all the available options. This optimum handling procedure is selected without requiring user intervention and without requiring all calls to be connected via a PBX.

The connection means may be operable to connect the handset to any suitable network or link. Preferably, the connection means are each operable to connect the handset to a different form or network or link. The networks or links may be either wired or wireless as desired. In particular wireless networks may include: one or more cellular telephone voice and/or data networks (such as those conforming to the GSM, CDMA, 3G and related standards); and one or more Wi-Fi, WiMax or other RF networks. Suitable wireless links may include: one or more RF links (such as those conforming to the BLUETOOTH™ standard); and one or more optical or infrared links. Suitable wired links may include any suitable form of cable including but not limited to standard telephone cables, USB cable and Ethernet cables.

The identification of valid handling options for a requested call by the rules unit may be determined by the identified source of an incoming call request or the identified destination of an outgoing call request. For outgoing connections this may further include determining whether connection is possible or available via each connection means. This may involve determining whether there is an available network or link of the type suitable for use by a particular connection means. The identification of valid handling options may additionally or alternatively be determined by reference to the time of the call request and or the location of the handset. This determination may involve consideration of any one or more of the following times: local handset time, universal time, identified source/destination local time.

The criteria for ranking the handling options may include but are not limited to identified source/destination; cost, quality, reliability, availability, bandwidth of connection; expected length of call; time of call request; expected duration of call; estimated power consumption or similar. Information relating to any or each of these criteria may be stored in a suitable data storage unit. The data storage unit may be updated manually or automatically. Updating may take place via a wired or wireless connection to updated data and may be controlled by a user or by an administrator.

The criteria used by the comparison unit may be preset or may be automatically adjusted. Additionally or alternatively, the criteria may be adjusted by a user of the handset or by an administrator. The adjustment may be achieved by use of the user interface means or in response to one or more calls or data messages received from an external source.

There may be a number of different ranking criteria settings stored as different operating modes. These operating modes may be stored in the data storage unit. The modes may be implemented manually in response to the user interface means or automatically in response to particular criteria. In particular, different modes may be automatically activated. This may be in response to time changes which can allow the handset to automatically operate different call handing procedures during and outside of business hours.

The valid call handling options may differ in respect of incoming or outgoing connections.

With regard to incoming calls, the valid handling options may include any one or more of the following: signalling the incoming call as usual, varying the signalling or omitting signalling; automatically answering, diverting or dropping the call whether immediately, after a predetermined interval or after the playing of a recorded message; automatically, dropping and returning the call whether immediately, after a predetermined interval or after the playing of a recorded message; contacting one or more separate systems and modifying the configuration of those systems in response to at least one of the source of the incoming call, time and/or date at the device, source of call or destination of call, device location as determined geographically or in relation to available data or cellular networks; selecting an operating mode from the set of available operating modes; or modifying the current set of rules used by the call handling engine. Modifying the rules applied may enable the handset to be switched from, say, 'home' mode to, say, 'office' mode by receiving a call from a designated number.

With regard to outgoing calls, the valid handling options may include any one or more of: blocking the requested call; modifying the requested destination number whether by varying digits or otherwise; diverting the requested connection to an alternative destination; making the call via a particular connection means, connection network or link; connecting the handset to a PBX from which further calls can be requested; notifying one or more separate systems of the requested call and/or the connection status; contacting one or more separate systems and modifying the configuration of those systems in response to at least one of the requested destination number, time and/or date at the device, source of call or destination of call, device location as determined geographically or in relation to available data or cellular networks; selecting an operating mode from the set of available operating modes; or modifying the current set of rules used by the call handling engine. Modifying the rules applied may enable the handset to be switched from, say, 'home' mode to, say, 'office' mode by calling a designated number.

The handset may indicate to a user that any such handling options have been enabled. The indication may take place in advance of, during and/or after the requested call. The indication may be automatic or may be in response to a user request.

In the event of a failure to enable the top ranked handling option, the enabling unit may be operable to retry to enable the same option. This may be repeated on a present number of occasions. Subsequently, the enabling unit may be operable to attempt to enable the next highest ranking handling option. For instance, for outgoing calls, in the event of a failure to establish a connection, the enabling unit may be operable to retry to establish the same connection. This may be repeated on a present number of occasions. Subsequently, the enabling unit may be operable to attempt to establish a connection via the next highest ranking connection means.

In accordance with a second aspect of the present invention there is provided a method of selecting the optimum handling procedure for an incoming or outgoing call requested of a telephone handset, the method comprising the steps of: identifying the valid options for handling the requested call; ranking the valid handling options according to predetermined criteria; and enabling the top ranked handling option.

The method of the second aspect of the present invention may incorporate any or all aspects of the telephone handset of the first aspect of the present invention as is required or as is desired.

In accordance with a third aspect of the present invention there is provided a telephone handset of the type comprising user interface means for requesting a connection to another handset or device; and a plurality of connection means for connecting voice calls to other handsets or devices via a plurality of different networks or other links wherein the handset is further provided with a connection routing engine comprising a connection identification unit, a comparison unit and a connection enabling unit, the connection identification unit operable to identify the valid options for making the requested connection and the comparison unit operable to rank the valid connection options according to predetermined criteria and the connection enabling unit operable to enable the connection means corresponding to the top ranked connection option.

The handset of the third aspect of the present invention may incorporate any or all aspects of the telephone handset of the first aspect of the present invention or the method of the second aspect of the present invention as is required or as is desired.

In accordance with a fourth aspect of the present invention there is provided a method of selecting the optimum routing of a connection requested by a telephone handset, the method comprising the steps of identifying the valid options for making the requested connection; ranking the valid connection options according to predetermined criteria; and enabling the connection via the top ranked connection option.

The method of the fourth aspect of the present invention may incorporate any or all aspects of the telephone handsets of the first or third aspects of the present invention or the method of the second aspect of the present invention as is required or as is desired.

In order that the invention is more clearly understood, one embodiment is now described further herein, with reference to the accompanying drawings, in which:—

Figure 2:
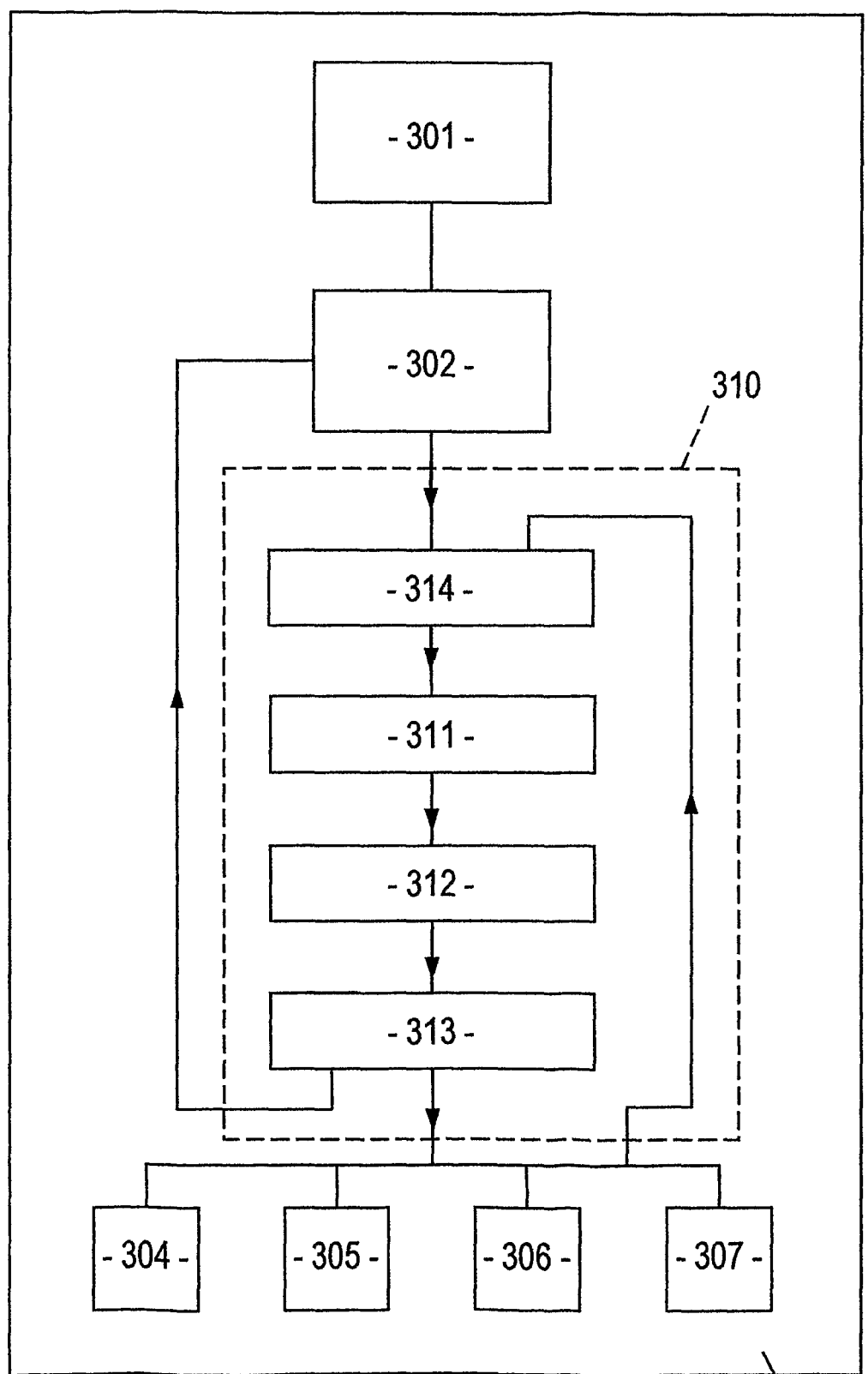

FIG. 1 is a schematic block diagram of a typical known local fixed line telephone system; and FIG. 2 is a schematic block diagram of a handset according to the present invention.

Referring now to FIG. 1, a typical local fixed line telephone network 100 of the type suitable for running the telephone operations at a single site or office comprises a private branch exchange (PBX) along with a plurality of local extensions 101, 102, 103. The local extensions are typically provided with telephone handsets but may also be connected to other devices such as fax machines, computers or similar if desired. For the present example discussion will be limited to connections to telephone handsets for the sake of simplicity.

The PBX is provided with a number of alternative connections 111, 112, 113 to the public switched telephone network (PSTN). Typically these connections may be via different telephone service providers. The PBX is also provided with a connection 114 to the internet allowing the PBX to facilitate VoIP connections. In some circumstances additional or alternative connections may be provided to the internet.

In the case of organisations having more than one site or office, dedicated private connections such as 150 may be provided to a second network 200 (and potentially to further networks) at other sites or offices. The second network 200 is similar to the first network 100 comprising a PBX, a plurality of local extensions 201, 202, 203, a plurality of alternative connections 211, 212, 213 to the PSTN and at least one internet connection 214.

When making a call between extensions in the network 100 (and likewise for the network 200) the call is routed via the PBXs i.e. each PBX routes calls between its own extensions. When routing a call externally of network 100 (and likewise for the network 200), the PBX is operable to connect the user's extension to the PSTN and thus allows the user to connect to the desired recipient. Of course, calls between extensions on different PBXs may go via the PSTN, but more usually would go via the PBX interconnect 150 or via the Internet connection 114, 214. In routing the call to the PSTN, the PBX may select to use a particular connection 111, 112, 113, 114 or 150. The connection chosen may depend on the destination of the call, the amount of previous call traffic or the time of day. For instance different connections may provide different prices for calls to destinations in particular locations or countries; various connections may have limits above which the price varies; or different connections may charge differently at various times of the day.

Whilst such a system works well in relation to fixed line networks, in the modern world many calls are made via mobile or cellular phones. Even if provided to a user on behalf of an organisation or business, such phones connect directly to a cellular network rather than to a local PBX. As such, the benefits of optimum call routing provided by a PBX are lost.

Turning now to FIG. 2, a block diagram of a telephone handset 300 according to the present invention is shown. The handset 300 is provided with a user interface 301 which may comprise a display unit, audio output unit and various user actuable keys as required. A phone controller 302 is operable to implement and respond to instructions from the user interface 301. Where the instructions from the user interface 301 request the connection of a call, the phone controller 302 is operable to connect the handset 300 to the PSTN via one of a plurality of connection means 304-307 provided. Similarly in the event of an incoming call connection request received via any one of the connection means 304-307, the phone controller 302 is operable to enable the connection of the call. The user may choose to accept or reject the connection using the interface 301.

Typically each connection means is operable to connect the handset 300 to the PSTN via a different network or link. Suitable networks might include one or more: cellular voice and/or data networks; RF data networks (WiFi, WiMax, etc); or local data networks. Suitable links might include any wired or wireless link including: suitable PC connections or similar such as USB or Ethernet etc; RF links such as those conforming to the BLUETOOTH™ specifications; optical links; or infrared links.

The handling of an incoming or outgoing call is determined by a call routing engine 310. The call routing engine 310 comprises an identification unit 314, a rules unit 311, a comparison unit 312 and an enabling unit 313.

The identification unit 314 for an incoming call identifies the source of an incoming call, typically by using a provided caller identification and for an outgoing call identifies the requested destination of the call. The rules unit 311 then uses the identified source/destination to identify the valid options for handling the call. The valid options may include whether to enable the call or not, whether to divert the call, whether to signal the call or call data to the user and whether to connect the call via any of the various connection means 304-307. This may involve beyond determining the identity of the source/destination, determining the local time at the handset and/or the source/destination and determining which of the connection means are functional at a particular time. For instance, whether a signal is being received from a particular cellular voice, cellular data or other data network or whether there are any BLUETOOTH™ devices within the required range. This can also be based upon the destination of the requested connection.

The comparison unit 312 is operable to rank the valid handling options according to predetermined criteria. These criteria might typically include handset/source/destination time, handset/source/destination location, cost, reliability, bandwidth or other quality factors. The criteria may also differ or be ranked differently depending upon the identified source/destination of the call. For instance, if a call to/from a valued client, reliability and quality of connection might be the prime criteria for selecting handling options with cost a secondary concern whereas for a call to another party cost may be the primary criterion. Whilst the criteria are predetermined, the values of the various criteria attributable to the various valid connection options are determined by the comparison unit at the time of requesting the connection. For example "is the handset roaming on a particular cellular voice network" is a criterion that might be relevant, particularly with relation to connection cost. The value of that criterion ("yes" or "no") can only be determined for sure at the time that the user attempts to place a call.

In some embodiments, the criteria are preset and stored in a data storage means (not shown). In other embodiments, the criteria can be adjusted using the user interface or remotely in response to a particular data message. In some such cases, the criteria can only be viewed or adjusted by a system administrator. This can be achieved by suitable security provisions such as the provision of a pass code.

The enabling unit 313 is operable to enable the handling option by instructing operation of the phone controller 302 or the connection means 304-307 in accordance with the top ranked handling option. The enabling means 313 thus functions as a switch to allow a call to be handled in the most preferred manner. In the event that an outgoing call is requested and connection via a preferred connection means 304-307 fails, the enabling unit 313 may be operable to retry the connection for a predetermined number of attempts before switching to attempting to connect using the next highest ranked connection means 304-307.

By way of non-limiting example, outgoing calls to a specifically identified destination may be handled according to any one of or more of the following: the call is blocked from taking place; the call is diverted or redialled using a modification of the destination number; or the call is placed via a separate system. For ease of understanding some aspects of these options are explained further below.

Number diversion or modification may involve calling a number that is based on the target number. For example, a call might be to an internal number 2017, which is an extension that can also be dialed from outside the internal phone system using the PSTN number 0161 919 0217. Thus the modification might be to translate 2017 to 0161 919 0217 and dial that, allowing the use of short codes on a mobile device that is not directly connected to the internal phone system. Alternatively, the modification may be to call a number that has a one-to-one relationship to the target number. For example, a call might be to an internal number 2017, which is an extension in a UK office. If the call is being made outside UK business hours, the call might be redialled to a mobile number associated with the user of extension 2017. As a further alternative, the modification may be to call a number that has a relationship with the target number. For example, a call might be to an internal number 2017, which is an extension in a UK office. If the call is being made outside UK business hours, the call might be redialed to a general switchboard number that is associated with more than one extension in that office.

The separate system may be a telephone switch, PBX, or similar system. Calls may be placed by the handset to the separate system using an access number, at which point the separate system may be instructed to: place a second call to the target destination and join the two calls; drop the first call, place a second call to the target destination and a third call back to the handset, joining the second and third calls when the handset answers the third call; or place a first call to the target destination and a second call back to the handset, joining the first and second calls when the handset answers the second call.

In some handling options, the handset may be operable to contact a separate system (typically a PBX or telephone switch). The contact can take the form of informing the separate system, via a data connection, that the call has taken place, including passing the target destination. For example, call records on the separate system might be updated to record the fact that the call took place, despite the fact that the separate system is not involved in placing that call. Alternatively, the contact may take the form of changing the configuration of that system; this might involve changing settings on the system that affect the handling of calls to or from the user. For example, detection of an outgoing call from a handset might cause the separate system to be configured so that future incoming calls to the user's deskphone extension also simultaneously ring the mobile, allowing the incoming call to be answered on either the mobile or deskphone. In such circumstances, if a call is blocked or cancelled by the separate system the user may be able to connect to the separate system to dial familiar shortcodes (such as *72 for call forward control) which are intercepted and turned into commands. This may further involve using a second call to the separate system, then sending DTMF tones to effect the change in configuration.

By way of non-limiting example, incoming calls from a specifically identified source may be handled according to any one of or more of the following: signalling the incoming connection as usual, varying the signalling or omitting signalling; automatically answering, diverting or dropping the connection whether immediately, after a predetermined interval or after the playing of a recorded message; automatically, dropping and returning the connection whether immediately, after a predetermined interval or after the playing of a recorded message. For ease of understanding some aspects of these options are explained further below.

Signalling the call to the user as usual may indicate signalling "as the device is currently configured to handle calls". As an alternative option, the call may be signalled to the user in a manner that is different to that configured on the device. For example, a device may be set to signal calls with no noise or vibration (only visual), yet calls from certain numbers would be signalled with ringing and vibration. Typically this would be used to grant some incoming calls higher visibility to the user.

As further handling options, the call may be dropped, without signalling or may be immediately diverted to voicemail or another number, without signalling. As an alternative to dropping or diversion without signalling, the call may be signalled for a period of time (where the signalling is to advise the user that the call has been handled, but not necessarily to allow the user to choose the handling via explicit action).

In some handling options, the call may be immediately answered (as through the user had manually answered the call) or the call may be answered, an audio message played to the caller, and then the call may be dropped, or made available to the user as though the user had manually answered the call. As a further option the call may be dropped and a second outgoing call placed to a number related to (or derived from) the caller identification of the incoming call. Typically this might be used if the cost of the call from a handset were lower than the cost of the call to it.

In a similar manner to the above described procedure for handling of an outgoing call, the call may proceed as normal (or in any of the ways above) but in addition to handling the call, the handset contacts a separate system (typically a PBX or telephone switch). The contact can take the form of informing the separate system, via a data connection, that the call has taken place, including passing the caller identification. For example, call records on the separate system might be updated to record the fact that the call took place, despite the fact that the separate system is not involved in placing that call. Alternatively, the contact may take the form of changing the configuration of that system; this might involve changing settings on the system that affect the handling of calls to or from the user. For example, detection of an incoming call to a device might cause the system to be configured so that future incoming calls to the user's deskphone extension are sent to voicemail whilst the call is in progress.

In use, the handset 300 might be a cellular phone provided to a user by an organisation or business employing the user. The handling engine 310 provided will enable the handset 300 to handle incoming and outgoing calls in a manner determined by the wishes of the employer. This can result in costs savings for the employer and/or better productivity of the user.

In particular examples with respect to outgoing calls, if the user is located within their usual office, the handset 300 may be operable to connect all outgoing calls via the local office PBX. This can be achieved if the handset can connect to a network or link which is connected to the PBX. For instance, there may be a WiFi network or similar within the office or alternatively, the handset may have BLUETOOTH™ capability and be operable to connect to another BLUETOOTH™ device either integral to or connected to the PBX, or alternatively, the handset may connect to a low power cellular network interconnected with the PBX. This will allow the PBX to route calls according to the normal operation in the prior art. As another example, if the user is away from their local office but within an accessible WiFi area, the handset 300 may be operable to connect outgoing calls via VoIP using the WiFi network. A further example would involve the handset automatically selecting a connection to a particular cellular network (or cellular network operator) over other potentially available cellular networks. This can allow a handset operable to connect to different cellular networks to select to connect to the cellular network with the most favourable tariff and/or connection quality with regard to the particular time and place at which the connection is requested.

Whilst the particular example has been described in terms of a cellular handset, it may equally be applied to a fixed line handset with provision for making voice call connection via alternative networks or links.

It is of course to be understood that the invention is not to be limited to the details of the above embodiment which is described by way of example only.

The invention claimed is:

1. A telephone handset of the type operable to make an outgoing connection to another handset or device and receive an incoming call from another handset or device, the telephone handset comprising:
    at least one connection apparatus for connecting incoming or outgoing voice calls to other handsets or devices via a plurality of different networks or other links wherein the handset is further provided with a call handling engine comprising an identification unit, a rules unit, a comparison unit and an enabling unit,
    wherein the identification unit is operable to identify the source of an incoming call or the destination of an outgoing call, the rules unit is operable to identify valid options for handling a requested incoming or outgoing call according to predetermined rules, the comparison unit is operable to rank the valid call handling options according to predetermined criteria and the enabling unit is operable to enable the top ranked handling option,
wherein the criteria for ranking the handling options include at least one of: identified source; identified destination; cost, quality, reliability, availability, bandwidth of connection; expected length of call; time of call request; expected duration of call; and estimated power consumption; and further wherein there are a number of different ranking criteria settings stored as different operating modes.

2. A telephone handset as claimed in claim 1 wherein the connection apparatus are each operable to connect the handset to a different form of wired or wireless network or link.

3. A telephone handset as claimed in claim 1 wherein the identification of valid handling options for making the requested call by the rules unit is determined by the identified source of an incoming call request or the identified destination of an outgoing call request.

4. A telephone handset as claimed in claim 3 wherein for outgoing calls this includes determining whether connection is possible or available via the or each connection apparatus.

5. A telephone handset as claimed in claim 3 wherein the identification of valid handling options is determined by at least one of: reference to the time of the call request and the location of the handset.

6. A telephone handset as claimed in claim 1 wherein information relating to any or each of these criteria is stored in a suitable data storage unit, which is updated manually or automatically.

7. A telephone handset as claimed in claim 1 wherein the criteria used by the comparison unit are preset or automatically adjusted.

8. A telephone handset as claimed in claim 1 wherein the criteria used by the comparison unit are adjusted by a user of the handset or by an administrator and said adjustment is achieved by use of a user interface or in response to one or more calls or data messages received from an external source.

9. A telephone handset as claimed in claim 1 wherein the modes are implemented manually or automatically.

10. A telephone handset as claimed in claim 1 wherein the valid call handling options differ in respect of incoming or outgoing calls.

11. A telephone handset as claimed in claim 1 wherein for incoming calls, the handling options include any one or more of the following: signaling the incoming call as usual, varying the signaling or omitting signaling; automatically answering, diverting or dropping the call whether immediately, after a predetermined interval or after the playing of a recorded message; automatically, dropping and returning the call whether immediately, after a predetermined interval or after the playing of a recorded message; contacting one or more separate systems and modifying the configuration of those systems in response to at least one of the source of the incoming call, time at the device date at the device, source of call, destination of call, device location as determined geographically, device location as determined in relation to available data or cellular networks; selecting an operating mode from the set of available operating modes; and modifying the current set of rules used by the call handling engine.

12. A telephone handset as claimed in claim 1 wherein for outgoing calls, the handling options include at least one of: blocking the requested call; modifying the requested destination number whether by varying digits or otherwise; diverting the requested call to an alternative destination; making the call via a particular connection apparatus, connection network or link; connecting the handset to a PBX from which further calls can be requested; notifying one or more separate systems of the requested call notifying one or more systems of the connection status; contacting one or more separate systems and modifying the configuration of those systems in response to at least one of the requested destination number, time and date at the device, source of call or destination of call, device location as determined geographically or in relation to available data or cellular networks; selecting an operating mode from the set of available operating modes; or modifying the current set of rules used by the call handling engine.

13. A telephone handset as claimed in claim 1 wherein the handset indicates to a user which handling options have been enabled at one or more of the following times: in advance of the requested connection, during the requested connection and after the requested connection.

14. A telephone handset as claimed in claim 13 wherein the indication is either automatic or may be in response to a user request.

15. A telephone handset as claimed in claim 1 wherein in the event of a failure to enable the top ranked handling option, the enabling unit may be operable to retry to enable the same option.

16. A telephone handset as claimed in claim 15 wherein in the event of continued failure to enable the top ranking option, the enabling unit is operable to attempt to enable the next highest ranking handling option.

* * * * *